United States Patent Office 2,758,444
Patented Aug. 14, 1956

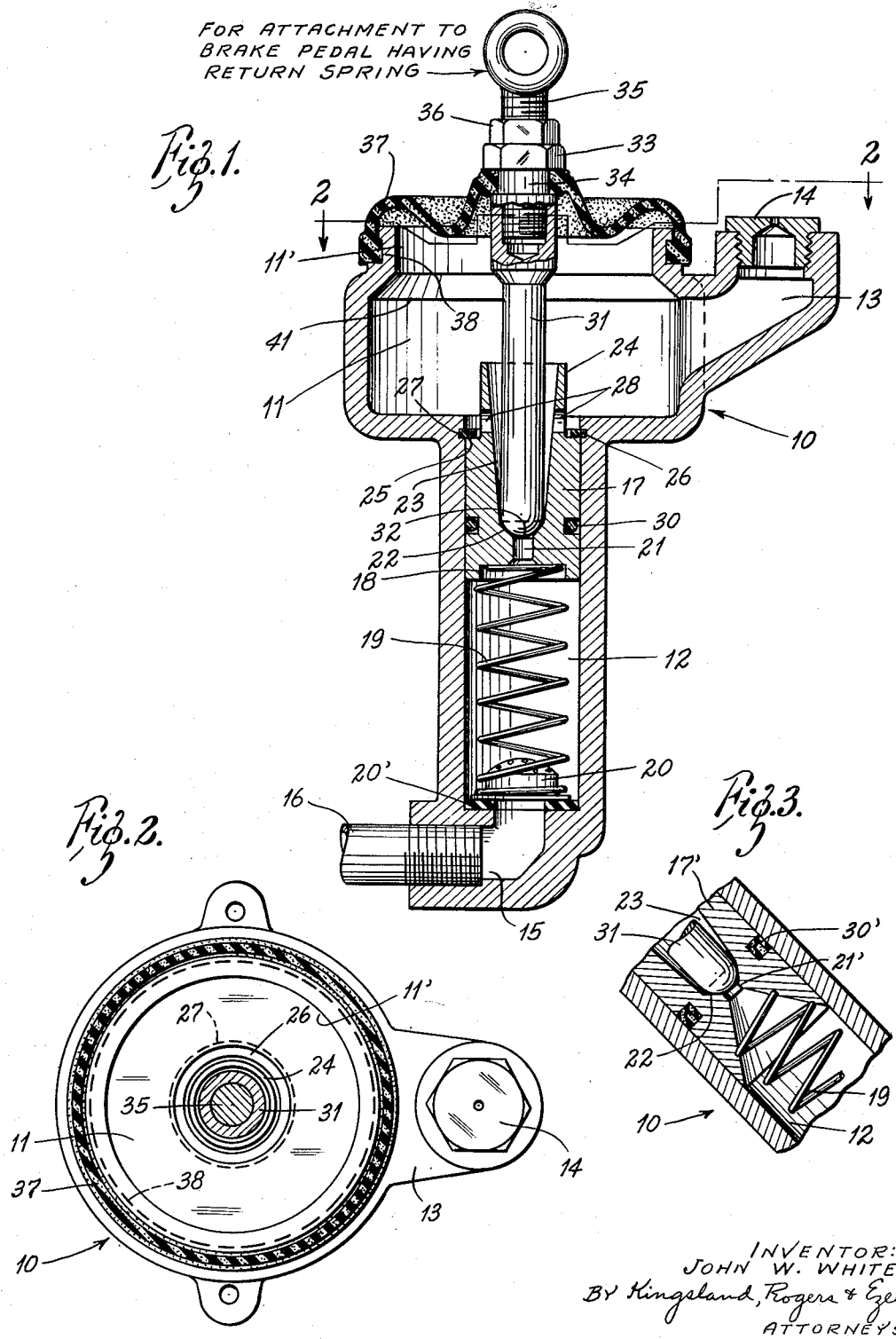

2,758,444

MASTER CYLINDER ASSEMBLY FOR HYDRAULIC BRAKES

John W. White, North Hollywood, Calif.

Application August 13, 1952, Serial No. 304,087

5 Claims. (Cl. 60—54.6)

The present invention relates to a master cylinder for hydraulic brakes and its particular objective is to produce a master cylinder of very simple construction that nevertheless will recharge and deaerate with every complete cycle of brake actuation. It is of the type having a piston with a passage axially through it, and a check valve operated by engagement of the actuating plunger with the piston.

Among the features of this particular master cylinder are the arrangement of the parts to provide a minimum axial dimension to the assembly without the sacrifice of any of the efficiency of operation, the provision of an actuating piston that is so designed as to prevent the inadvertent separation therefrom of the brake pedal plunger, without the necessity of pinning or otherwise attaching the plunger to the piston, the elimination of the necessity of employing the familiar piston sealing cup, and the provision of an assembly that is inexpensive to manufacture and inexpensive to assemble for installation and use in a vehicle, or in any other installation in which a device of this kind is to be used.

In the drawings:

Fig. 1 is a diametrical section through the master cylinder assembly;

Fig. 2 is a horizontal section taken on the line 2—2 across the upper end of Fig. 1; and Fig. 3 is a fragmental section showing a piston design adapted particularly for angular mounting.

In the preferred construction, the master cylinder includes a casing, generally indicated at 10, and primarily divided into an upper reservoir 11 and a lower actuating cylinder 12. (The preferred mounting is vertical and the description will so assume. However, horizontal or angular mounting may be used under some circumstances.) It is desired to have the cylinder section somewhat smaller in diameter than the reservoir, as this aids in reducing the axial length of the apparatus. It will be understood that the cylinder 12 is machined, as is required for the use of the device as will appear.

The upper end of the reservoir 11 is open at its top as shown at 11', and it is desirable to have a recharging and breather cap arrangement 13 formed as part of the reservoir 11. A removable screw-threaded filler and breather plug 14 may be employed.

The bottom of the housing 10 at the lower part of the cylindrical portion 12 has a liquid outlet 15 with a pipe 16 leading therefrom, this being designed to typify the outlet line or lines from the master cylinder such as are used on hydraulic brakes. It will, of course, be understood that this master cylinder may be used for purposes other than hydraulic brakes, but, as the greatest use of this type of device is in that connection, the description will be related especially to brakes.

Within and reciprocable along the cylinder portion 12, there is a piston 17. This piston conveniently may be made of a suitable metal. In its lower portion, it has a recess 18 to receive and center the upper end of a return coil spring 19. This return coil spring rests at its lower portion upon a residual pressure valve 20 that is seated upon a sealing disc 20', as will appear. In Fig. 3, the piston 17' is shown as having a conical recess in its lower end. Such recess is especially desirable for angular mounting.

Above the recess 18, the piston 17 has a port 21, the upper end of which is tapered outwardly at 22 to form a valve seat. This portion of the piston at which the passages form the valve seat is called the valve portion of the piston. Above the tapered portion 22, there is a frusto-conical diverging wall portion 23 that extends out the top of the piston. It will be observed that, in the upper position illustrated, the piston has a flange or rim portion 24 that projects well into the reservoir 11. This rim or flange 24 is of smaller outside diameter than that of the principal portion of the piston 17, and it terminates at its bottom in a shoulder 25. This shoulder may engage a retaining ring 26 that can be snapped into place within a suitable groove 27 in the surface of the cylinder 12 when the piston 17 is depressed. Immediately above the shoulder, the skirt portion or rim portion 24 is provided with a plurality of openings 28.

It is not necessary to describe the residual pressure valve 20 since it may be one of those known in the art that insures the retention of a certain predetermined amount of pressure within the outlet system 16, and after the pressure in the cylinder between the disc 20' and the under surface of the piston 17 has been relieved.

The piston is not required to have the conventional rubber cup element, and may be sealed by a ring seal 30. This may be an O-ring, or U-ring or chevron packing. A U-ring is illustrated at 30' in Figs. 3. While the use of a high packing—i. e., one above the working face of the piston—is preferred to save on length, it will be understood that a conventional rubber cup, adequately ported, may be used if desired.

The piston is actuated downwardly by a plunger 31. This plunger has a rounded lower surface 32 that, when forced downwardly, engages the tapered portion 22 within the piston 17, and seats firmly thereon in a sealing manner, thereby acting as a valve. This is the simplest and most desirable form of check valve, but it will be understood that variations may be used. The upper end of the plunger 31 has a hexagonal head 33 on it, just above a groove 34. The upper end of the plunger 31 has an internally threaded hole that receives the end of an extension 35 shown in the form of a clevis eye, for attachment to a brake pedal that has a conventional pedal return spring. The extension is threadedly adjustable in the plunger, and is secured in position by a nut 36. A fully flexible rubber boot 37 is attached around the plunger assembly 31 and also is ribbed at its outer edge so as to engage within a suitable groove 38 around the upper edge of the reservoir 11.

In Fig. 3, the piston 17' is shown as having a conical face, which may be used when air pockets might form below the piston, and particularly where the master cylinder assembly is given an angular mounting.

Operation

When the brake pedal is released, the plunger 31 is drawn into its upward position illustrated, by the conventional return spring of the brake pedal. The piston 17 is located in its illustrated retracted position under the influence of the spring 19. Its upward movement is limited by the fact that its shoulder 25 engages the retaining ring 26. At this time, the rim 24 projects upwardly into the cylinder 11. The openings 28 may freely conduct the liquid from the reservoir 11 into the recess 23. This liquid thereby flows down around the sides of the plunger 31, and, as the plunger is normally retracted somewhat above the valve seat 22, the liquid may flow around the lower end of the plunger, through the port 21, and into the cylinder 12 below the piston 17. At the same time, any air or vapor that is within the cylinder 12 can escape upwardly through the piston to the top of the reservoir by way of the port 21. The distance that the plunger 31, and more particularly its valve portion 32, is retracted from the valve seat 22 when the parts are in their rest positions may be adjusted by adjusting the extension 35.

When it is desired to operate the brakes or for any reason to operate the master cylinder to obtain pressure in the outlet 16, the plunger 31 is depressed. The first stage of this depressing operation forces the plunger head 32 down against the valve seat 22 of the piston 17. Owing to the fact that the head 32 is hemispherical, it is self-aligning and any wear tends merely to cause the device to coin itself to maintain proper seating.

After the valve has been closed, continued downward movement of the plunger 31 causes the piston 17 to be depressed against the action of its spring 19 and against any resistance transmitted through the hydraulic fluid. The downward movement of the piston 17 causes the fluid to be expelled into the outlet 16. The piston is continued down the desired distance.

When it is desired to release the piston, the brake pedal is released which, in effect, causes an immediate withdrawal of the plunger 31 under influence of the brake pedal return spring. There is practically no resistance to this withdrawal as the plunger moves upwardly through the fluid in the hydraulic reservoir 11 quite freely. It moves upwardly more rapidly than does the piston 17, which acts only under the influence of the spring 19. This withdrawal of the plunger 31 immediately reopens the valve at 22, so that the piston 17 is forced back to some extent through the fluid and in a manner to assure the recharging of the cylinder 12 with fluid to whatever extent is necessary to insure a fully charged system. At the same time, any air or other gas may escape through the port 21 and past the valve seat 22. The piston will rise until the shoulder 25 engages the snap ring, and at this time it does not, in the preferred adjustment, completely reclose the valve.

The downward movement of the piston 17 is limited primarily by the height of the spring 19 in its compressed condition. Since the plunger 31 moves up more rapidly than does the piston 17, the applicant has made provision for preventing the plunger 31 from withdrawing from the piston. This consists in making the recess 23 of such depth that it is at least substantially as long as and preferably somewhat longer than the total stroke of the piston. Hence, when the plunger rises and the piston is still in its downward position, the plunger will, even in its uppermost position, remain within the tapered opening 23, so that the piston 17 may rise and reposition the valve seat 22 near to the head 32 of the plunger and ready for a subsequent operation.

This arrangement has an obvious manufacturing advantage over the lost motion pin connection in master cylinders, such as that illustrated in applicant's Patent No. 2,284,935. In the present structure, the combination of the rim 24 and the passages 28 affords adequate stability of the piston and plunger combination as described without requiring a substantially deeper reservoir, and without requiring the pin such as is shown in the patent referred to. Furthermore, it does not require the addition of another element with a guiding function as has been proposed in the art. The rim 24 always is maintained at its proper distance below the head of the plunger 31, which is not a characteristic of a member that is attached to the bottom of the reservoir 11 around the junction of the cylinder 12 with that reservoir. Thus the use of the rim 24 on the piston 17 aids in making the device much more compact as well as more dependable in its operation. Also, it is very much easier to assemble.

While this piston 17 may be used if especially desired with the more conventional rubber packing cup, it is not necessary as a ring packing 30 may be used. With the present type of assembly, it is not necessary that the packing cup have a valving function that is required in the more conventional type of master cylinder for hydraulic brakes. In the present arrangement, the valve is entirely composed of the piston and the plunger.

The assembly of this master cylinder construction is very simple. Starting with the housing 10, the residual pressure control valve parts 20 may be dropped into the bottom in proper positions. Then the spring 19 may be placed in position above them and the piston 17 with its packing ring 30 disposed within the cylinder 12 above the spring. This piston may be depressed a distance to render it convenient to put the snap ring 26 in place, after which the cylinder assembly is complete. The plunger 31 has the boot 37 fastened to it and snapped over the rim of the reservoir 11. The eye or other available fitting of the extension 35 may be spaced properly by adjustment of the extension within the main plunger portion and the parts attached to the brake. Of course, this presupposes some proper mounting of the cylinder on the frame of the vehicle.

The boot 37 is designed to displace substantially the same amount as does the piston 17. This minimizes the pumping in the reservoir. The liquid level is preferably maintained about at the line 41, which is approximately at the convergence of the upper end of the reservoir.

In order to charge the device with hydraulic fluid, the plug 14 is removed and the desired amount of fluid is introduced into the master cylinder, and the system is charged as is known in the art.

The unit is especially designed for vertical mounting, but in some cases it may be mounted angularly or horizontally. For aid in permitting the back-flow of air and vapor from the cylinder 12 to the reservoir, in non-vertical mountings, the concave piston face illustrated in Figure 3 may be used. This enables the valve seat 22 to remain higher than other parts of the cylinder despite considerable angularity to the mounting of the assembly. Of course, there must be a supply of liquid back of the piston, with means for its gravity flow past the valve into the cylinder. Features of the invention may be employed in modified assemblies, as will be understood.

What is claimed is:

1. In a master cylinder construction, a housing including a cylinder and a liquid reservoir into one end of which the cylinder opens, the cylinder having an outlet at its other end opposite to the reservoir, a piston slidable within the cylinder toward and from the reservoir, stop means to limit the movement of the piston toward the reservoir, the piston having a recess extending into it from its reservoir end to its other end and the recess having a passage connecting it through to the other end of the piston, the piston having a portion in the recess formed to provide a valve element, the recess from the valve element to the reservoir end being at least as great as the length of the stroke of the piston within the cylinder, the piston including a projection extending into the reservoir when the piston is in its extreme position toward the reservoir, the recess extending through that projection, and fluid passage means through the projection to connect into the recess within the piston, said fluid passage means being adjacent the bottom of the reservoir when the piston is in its extreme position toward the reservoir, and the projection being reduced in external dimension to less than the diameter of the cylinder to provide for fluid flow from the reservoir into the recess in the piston adjacent the valve portion at all times.

2. In a master cylinder construction, a housing including a cylinder and a liquid reservoir into one end of which the cylinder opens, the cylinder having an outlet at its other end opposite to the reservoir, a piston slidable within the cylinder toward and from the reservoir, stop means to limit the movement of the piston toward the reservoir, the piston having a recess extending into it from its reservoir end to its other end and the recess having a passage connecting it through to the other end of the piston, the piston having a portion in the recess formed to provide a valve element, the recess from the valve element to the reservoir end being at least as great as the length of the stroke of the piston within the cylinder, and a plunger for actuating the piston, the plunger having an end engageable within the recess in the piston and cooperable with the valve element on the piston to constitute a valve, and means supporting the plunger on the housing for movement in the recess relatively to the piston, the piston including a projection extending into the reservoir when the piston is in its extreme position toward the reservoir and through which the recess extends, and fluid passage means through the projection to connect into the recess within the piston, said fluid passage means being adjacent the bottom of the reservoir when the piston is in its extreme position toward the reservoir, and the projection being reduced in external dimension to less than the diameter of the cylinder to provide for fluid flow from the reservoir into the recess in the piston adjacent the valve portion at all times.

3. In a master cylinder, a housing including an upper portion formed to constitute a liquid reservoir and a cylindrical extension coaxial with the reservoir and extending from the bottom thereof, the reservoir being open at its top, a piston vertically reciprocable within the cylindrical extension, a spring below the piston urging the piston upwardly, the spring and the piston in the order named being insertable into the cylinder through the top of the reservoir, a spring clip type of retaining device adapted to be inserted into the cylinder above the piston to retain the piston against removal, the piston having a reduced diameter in its upper portion to provide a shoulder engageable with the spring clip to limit the upward movement of the piston, the reduced portion of the piston extending upwardly from said shoulder and projectable into the reservoir when the piston is in its upper position, passage means through the reduced portion of the piston adjacent the shoulder, there being a recess extending downwardly from the top of the piston into which said passages communicate, the recess having a valve seat at its lower end and a port from the valve seat through to the under side of the piston, and a plunger having a valve portion formed on its lower end, the plunger being interfitted into said recess for engagement with the valve seat to close the passage through the piston when the plunger is depressed to depress the piston, and being withdrawable from said valve seat to permit the piston to rise under the influence of the spring, and the recess being of a depth greater than the stroke of the piston.

4. A master cylinder unit including a housing having a cylinder and a reservoir into which one end of the cylinder opens, a piston reciprocable in the cylinder from its reservoir end toward the other end, an outlet from the said other end of the cylinder, a spring between the operating face of the piston and the end of the cylinder to urge the piston toward the reservoir, packing means around the piston inwardly of the operating face thereof, means engaging the piston to limit its movement by the spring to a rest position, a projection on the outer end of the piston extending into the reservoir when the piston is in rest position, an opening from the end of the projection through the piston and having a portion therein shaped to form a valve element, the opening from the valve element to the reservoir end being longer than the stroke of the piston, a passage through the projection to communicate with the reservoir, a plunger disposed in the reservoir and having an end movable into engagement with the valve element to cut off communication through the piston, the plunger extending out through the reservoir for connection to an actuating means, and a flexible boot between the reservoir and the plunger.

5. In a master cylinder construction, a housing including a vertical cylinder having an outlet at one end thereof and a reservoir entrance communicating into the cylinder at the opposite portion of the cylinder; a piston in the cylinder slidable toward the outlet from a retracted position to an advanced position, the piston having a pressure face on its end facing the outlet, stop means to limit retraction of the piston, the piston having a projection extending backward beyond the point of the reservoir entrance into the cylinder and of a length to project into the reservoir when the piston is retracted, the piston having a socket recess extending from its back end toward its pressure face, with a fluid flow passage from the bottom of the socket through the pressure face; valve means at the bottom of the socket for regulating flow through the passage; the piston projection having a port through the wall thereof, the projection being reduced on its outside surface adjacent the port to less than the size of the cylinder, the port and the reduced part providing for conduction of liquid from the reservoir entrance into the cylinder at all times during the movement of the piston.

References Cited in the file of this patent
UNITED STATES PATENTS

| | | |
|---|---|---|
| 2,060,846 | Bowen | Nov. 17, 1936 |
| 2,136,835 | Begg | Nov. 15, 1938 |
| 2,152,499 | Rasmussen | Mar. 28, 1939 |
| 2,223,424 | Main | Dec. 3, 1940 |
| 2,246,141 | Main | June 17, 1941 |
| 2,262,843 | Goepfrich | Nov. 18, 1941 |
| 2,284,935 | White | June 2, 1942 |
| 2,447,142 | Smith et al. | Aug. 17, 1948 |
| 2,477,758 | Majneri | Aug. 2, 1949 |
| 2,608,062 | White | Aug. 26, 1952 |